US009054843B2

(12) United States Patent
Frederiksen et al.

(10) Patent No.: US 9,054,843 B2
(45) Date of Patent: Jun. 9, 2015

(54) SEARCH SPACE ARRANGEMENT FOR CONTROL CHANNEL

(75) Inventors: Frank Frederiksen, Klarup (DK); Peter Skov, Beijing (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 554 days.

(21) Appl. No.: 13/361,210

(22) Filed: Jan. 30, 2012

(65) Prior Publication Data

US 2013/0195020 A1   Aug. 1, 2013

(51) Int. Cl.
*H04Q 9/00* (2006.01)
*H04L 5/00* (2006.01)

(52) U.S. Cl.
CPC ................... *H04L 5/0053* (2013.01)

(58) Field of Classification Search
CPC .................... H04W 72/042; H04W 72/14
USPC ............... 370/315, 329; 455/70, 509
See application file for complete search history.

(56) References Cited

U.S. PATENT DOCUMENTS

| | | | | |
|---|---|---|---|---|
| 8,441,996 B2* | 5/2013 | Kim et al. | | 370/329 |
| 2010/0279628 A1* | 11/2010 | Love et al. | | 455/70 |
| 2011/0194412 A1* | 8/2011 | Park et al. | | 370/241 |
| 2011/0194524 A1* | 8/2011 | Hedlund et al. | | 370/329 |
| 2011/0243090 A1* | 10/2011 | Grovlen et al. | | 370/329 |
| 2012/0008586 A1* | 1/2012 | Kwon et al. | | 370/329 |
| 2012/0176884 A1* | 7/2012 | Zhang et al. | | 370/203 |
| 2013/0077560 A1* | 3/2013 | Horiuchi et al. | | 370/315 |
| 2013/0107822 A1* | 5/2013 | Papasakellariou et al. | ... | 370/329 |
| 2013/0114565 A1* | 5/2013 | Chen et al. | | 370/330 |
| 2013/0163551 A1* | 6/2013 | He et al. | | 370/329 |
| 2013/0182664 A1* | 7/2013 | Chen et al. | | 370/329 |
| 2013/0294332 A1* | 11/2013 | Kim et al. | | 370/315 |

FOREIGN PATENT DOCUMENTS

| | | |
|---|---|---|
| EP | 2 352 242 A1 | 8/2011 |
| EP | 2352350 A1 | 8/2011 |
| EP | 2 557 710 A2 | 2/2013 |
| WO | 2011/126329 A2 | 10/2011 |

OTHER PUBLICATIONS

International Search Report and Written Opinion international application No. PCT/EP2013/051713 mailed on Jun. 20, 2013.

(Continued)

*Primary Examiner* — Wanda Z Russell
(74) *Attorney, Agent, or Firm* — Squire Patton Boggs (US) LLP (57) ABSTRACT

Control channels can benefit from a search space arrangement. For example, an evolved or enhanced physical downlink control channel (E-PDCCH) in the long term evolution advanced (LTE-A) physical layer can benefit in its design from a search space arrangement. A method can include indicating a control channel search space by a pair of parameters. The pair of parameters can include a physical resource block index and an explicit control channel element index. The method can also include transmitting on the control channel within the search space.

26 Claims, 8 Drawing Sheets

(56) References Cited

OTHER PUBLICATIONS

Nokia et al: "Discussion on Backhaul Reference Signal Design"; 3GPP Draft; R1-102968-Discussions on Backhaul Reference Signal Design; 3rd Generation Partnership Project (3GPP), Mobile Competence Centre; 650, Route des Lucioles; F-06921 Sophia-Antipolis Cedex; France; vol. RAN WG1, no. Montreal, Canada; 20100510, May 4, 2010, XP050420079, [retrieved on May 5, 2010]; p. 5, paragraph 2; p. 4, paragraph 5.

WO International Search Report for WO PCT/EP2013/051713, dated May 17, 2013.

* cited by examiner

E-PDCCH_a: 0, 1, 5, 2, 6, 7, 3
E-PDCCH_b: 0, 1, 5, 2, 6, 7, 3
E-PDCCH_c: 0, 1, 5, 2, 6, 7, 3

SEARCH SPACE ARRANGEMENT FOR CONTROL CHANNEL

BACKGROUND

1. Field

Control channels can benefit from a search space arrangement. For example, an evolved or enhanced physical downlink control channel (E-PDCCH) in the long term evolution advanced (LTE-A) physical layer can benefit in its design from a search space arrangement.

2. Description of the Related Art

LTE downlink physical layer was previously based on common reference signals (CRS) but may later be based on more user equipment (UE) specific reference signals. Release 10 of LTE may be unable to fully provide the benefits of demodulation reference signal (DM RS) based transmission, because the system still relies on cell specific reference signals to demodulate control information. This leads to increased control overhead in the system.

In a relay physical downlink control channel (R-PDCCH) for a relay backhaul link, physical resource blocks (PRBs) can be shared semi-statically with first slot for E-PDCCH carrying downlink (DL) downlink control information (DCI) and second slot for E-PDCCH carrying uplink (UL) DCI or physical downlink shared channel (PDSCH). Also, in R-PDCCH design, PRB-level spectrum sharing (SS) may be supported.

In R-PDCCH, however, a search space is configured by indicating resource blocks where R-PDCCH may be present. Additional explicit component carrier element (CCE) index is not signaled. Further, for R-PDCCH, the UL and DL allocations are located in different physical locations—the different slots will carry information for each link direction.

SUMMARY

According to certain embodiments, a method includes indicating a control channel search space by a pair of parameters. The pair of parameters includes a physical resource block index and an explicit control channel element index. The method also includes transmitting on the control channel within the search space.

An apparatus, according to certain embodiments, includes indicating means for indicating a control channel search space by a pair of parameters. The pair of parameters includes a physical resource block index and an explicit control channel element index. The apparatus also includes transmitting means for transmitting on the control channel within the search space.

A non-transitory computer readable medium is, in certain embodiments, encoded with instructions that, when executed in hardware, perform a process. The process includes indicating a control channel search space by a pair of parameters. The pair of parameters includes a physical resource block index and an explicit control channel element index. The process also includes transmitting on the control channel within the search space.

In certain embodiments, an apparatus includes at least one processor and at least one memory including computer program code. The at least one memory and the computer program code are configured to, with the at least one processor, cause the apparatus at least to indicate a control channel search space by a pair of parameters. The pair of parameters includes a physical resource block index and an explicit control channel element index. The at least one memory and the computer program code are also configured to, with the at least one processor, cause the apparatus at least to transmit on the control channel within the search space.

According to certain embodiments, a method includes processing a received indication of a control channel search space by a pair of parameters, wherein the pair of parameters includes a physical resource block index and an explicit control channel element index. The method also includes attempting blind decoding of the control channel using a search strategy based on the received indication.

An apparatus, according to certain embodiments, includes processing means for processing a received indication of a control channel search space by a pair of parameters, wherein the pair of parameters includes a physical resource block index and an explicit control channel element index. The apparatus also includes decoding means for attempting blind decoding of the control channel using a search strategy based on the received indication.

A non-transitory computer readable medium is, in certain embodiments, encoded with instructions that, when executed in hardware, perform a process. The process includes processing a received indication of a control channel search space by a pair of parameters, wherein the pair of parameters includes a physical resource block index and an explicit control channel element index. The process also includes attempting blind decoding of the control channel using a search strategy based on the received indication.

In certain embodiments, an apparatus includes at least one processor and at least one memory including computer program code. The at least one memory and the computer program code are configured to, with the at least one processor, cause the apparatus at least to process a received indication of a control channel search space by a pair of parameters, wherein the pair of parameters includes a physical resource block index and an explicit control channel element index. The at least one memory and the computer program code are also configured to, with the at least one processor, cause the apparatus at least to attempt blind decoding of the control channel using a search strategy based on the received indication.

In certain embodiments, a method includes deriving a control channel search space based on a set of physical resource blocks and a control channel element identifier. The control channel search space allows the control channel to be transmitted with different code rates, transmitted in different physical resource blocks, localized into one physical resource block, or distributed into multiple physical resource blocks.

A non-transitory computer readable medium is, in certain embodiments, encoded with instructions that, when executed in hardware, perform a process. The process includes deriving a control channel search space based on a set of physical resource blocks and a control channel element identifier. The control channel search space allows the control channel to be transmitted with different code rates, transmitted in different physical resource blocks, localized into one physical resource block, or distributed into multiple physical resource blocks.

An apparatus, according to certain embodiments, includes at least one processor and at least one memory including computer program code. The at least one memory and the computer program code are configured to, with the at least one processor, cause the apparatus at least to derive a control channel search space based on a set of physical resource blocks and a control channel element identifier. The control channel search space allows the control channel to be transmitted with different code rates, transmitted in different physical resource blocks, localized into one physical resource block, or distributed into multiple physical resource blocks.

According to certain embodiments, an apparatus includes deriving means for deriving a control channel search space based on a set of physical resource blocks and a control channel element identifier. The control channel search space allows the control channel to be transmitted with different code rates, transmitted in different physical resource blocks, localized into one physical resource block, or distributed into multiple physical resource blocks.

BRIEF DESCRIPTION OF THE DRAWINGS

For proper understanding of the invention, reference should be made to the accompanying drawings, wherein.

DETAILED DESCRIPTION

Long term evolution (LTE) of the third generation partnership project (3GPP) can employ an enhanced physical downlink control channel (E-PDCCH, which can also be referred to interchangeably as e-PDCCH and ePDCCH), which utilizes additional resources to allow for more scheduling and multiplexing flexibility. Certain embodiments enable a downlink control channel that can be demodulated based on demodulation reference signal (DM RS). More specifically, certain embodiments provide a method and system for multiplexing multiple users within one physical resource block (PRB).

For example, certain embodiments provide a search space definition that allows for creating scheduling signaling options for user equipment (UEs) that are both localized and scattered, while supporting aggregation of physical resources in both domains (localization and scattering domains). In certain embodiments, generic methods for E-PDCCH search space definition can be simple, allow for different aggregation levels, allow for user multiplexing, allow for diversity transmission as well as for localized transmission (exploiting the frequency dependent packet scheduling). For example, certain embodiments provide rules for mapping the E-PDCCH search spaces to the physical resources.

In particular embodiments, a PRB is split into a plurality of smaller parts (for example, four parts), each of which can be referred to as a enhanced control channel element (E-CCE). In the face of four parts, there are three possible aggregation levels inside a PRB (this is the only option when utilizing all possibilities while considering aggregating using powers of two when combining resources). In an alternative embodiment, 3 E-CCEs can be aggregated. Aggregations by using the same CCEs from different PRBs are also defined in certain embodiments. A set containing 2-tuples (PRB, index) can be defined and can, in different ways, indicate which PRBs, indices and aggregations to use when defining E-PDCCH candidates.

Thus, certain embodiments provide a method for search space definition on ePDDCH. Conventionally, search space definitions can be constructed in such a way that each aggregation level has its own starting point in the possible search tree. The possibility for jointly providing support for localized E-PDCCH as well as for distributed E-PDCCH may exist with this approach. Moreover, with this approach, an anchoring point that is common to a UE may exist, but for legacy PDCCH, such an anchor point does not seem to exist.

Thus, rather than being directed generally to splitting/multiplexing multiple users within a single PRB, certain embodiments provide a way of constructing the search spaces for reducing the blind decoding attempts needed for detecting the user equipment (UE) allocation, while ensuring the needed properties of coverage, diversity, multiplexing flexibility, and the like. For example, in certain embodiments, E-PDCCH search space is indicated by a PRB pair index and additional explicit CCE index. In some cases, a PRB pair can be referred to simply as a "PRB."

Certain embodiments, therefore, employ implicit rules regarding how to combine a set of PRBs with search space per PRB and how to drop some combinations while adding others (for example, for diversity). Different methods can be tailored to address the specific needs of the system, such as diversity mode or frequency dependent packet scheduler (FDPS) mode, for addressing coverage scenarios.

The E-PDCCH differs from a conventional PDCCH at least in that the E-PDCCH can be allocated in localized fashion, so that the control channels would only occupy resources within a limited set of PRB pairs, or even within a single PRB pair. A common reference signal based on DM RS can be transmitted so that multiple users can use the same reference signal, but the common reference signal may only be transmitted in the PRBs carrying the control channel.

Certain embodiments, therefore, provide a search space definition that allows for creating scheduling signaling options for user equipment (UEs) that are both localized and scattered, while supporting aggregation of physical resources in both domains (localization and scattering domains).

Certain embodiments of a search space of E-PDCCH can fit to a system where frequency division multiplexing (FDM) is used to multiplex E-PDCCH and PDSCH and multiplexing is done with PRB granularity. Mechanisms can be in place that will ensure a division of the physical resources into a number of control channel elements per PRB (or any other larger set of physical resources).

More particular, certain embodiments can reuse a control channel element (CCE) principle. As an example, one PRB may carry 4 CCEs, which leads to approximately similar E-CCE sizes as with LTE Release 8 (30-40 REs). How such E-CCEs are mapped to physical resources and how channel estimates for demodulation are obtained are not discussed herein. That mapping and estimation, therefore, can be performed according to any way desired. A certain E-CCE can be indexed by the PRB number and a length 4 index to select among the E-CCEs that are defined within one PRB, as shown in FIG. 1, where the resources on one PRB are remapped to 4 E-CCEs with indices 0-3.

Figure 1:
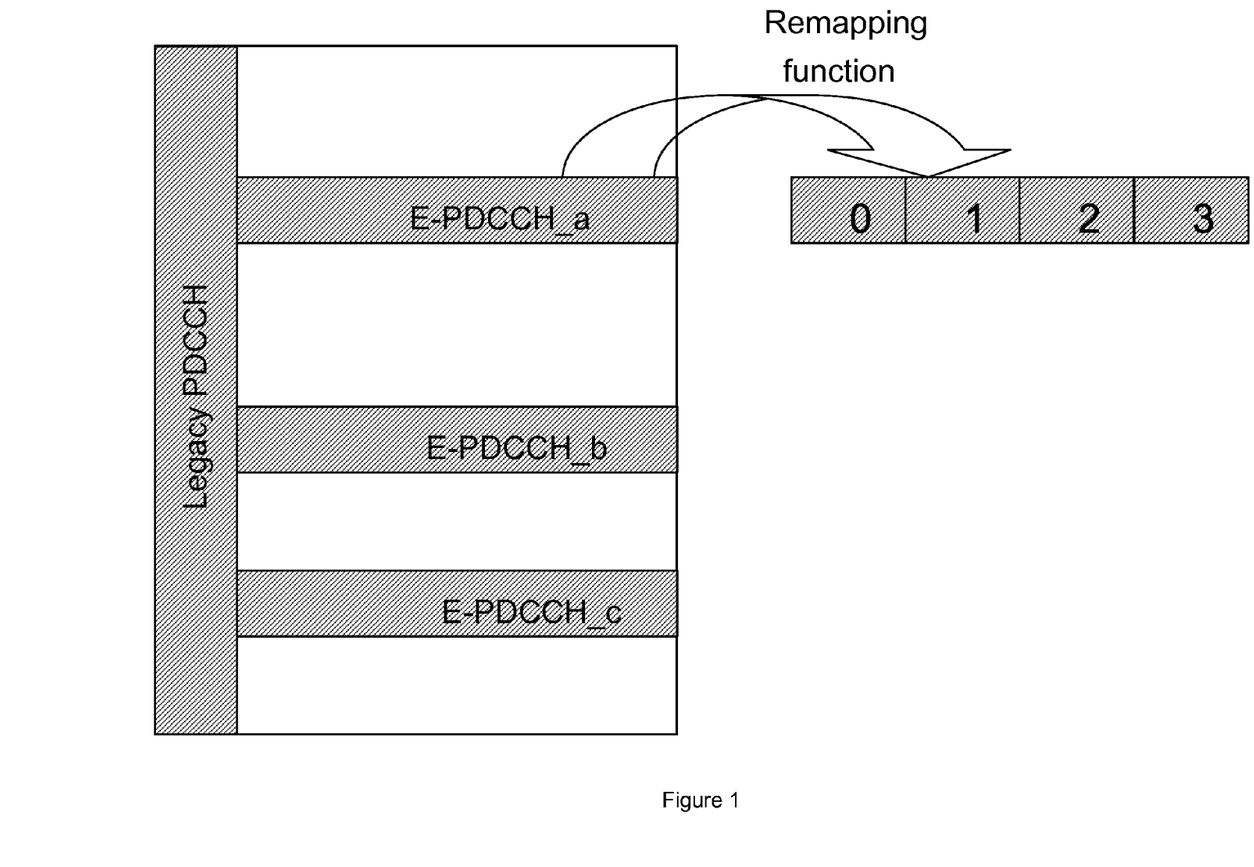
FIG. 1 illustrates exemplary E-PDCCH resources within a single subframe.

FIG. 1 illustrates E-PDCCH resources within a single subframe. As can be seen in FIG. 1, a legacy physical downlink shared channel (PDSCH) can include E-PDCCH_a, E-PDCCH_b, and E-PDCCH_c. A remapping function can divide up a given PRB (for example, E-PDCCH_a) into, for example, 4 E-CCEs, designated 0, 1, 2, and 3.

In order for a UE to know where to search for its downlink control information (DCI), one aspect for the UE to know may be where to start searching. Another alternative would be for the UE to exhaustively search all possibilities, but this may take a lot of resources from a signal processing point of view, while at the same time increases the probability of erroneously accepting an allocation that is not intended for the given UE. Such a case of erroneously accepting of DCI that is not intended for a UE is called a false positive. A starting index, therefore, can be defined such that a UE knows which CCE index it should be using as a reference.

When creating search spaces, it is possible to achieve multiple targets at the same time. The targets can include UE multiplexing, resource utilization, frequency diversity, and coverage. In the following discussion, a set of methods are described that can be combined to achieve these properties for the search space definitions.

One concern can be handling coverage. Assuming that a UE is already given a reference index that will be used for creating its search space, a search space can be created. To create coverage, physical resources can be combined to yield better channel coding. By having more physical resources, the channel coding procedure can have constant amount of input bits, and thus the rate matching circuitry can allow for more redundancy bits to be transmitted over the air interface. As a specific approach here, aggregation of the physical resources can follow an original index that was derived, such that the combined or aggregated physical resources will always include the include the original E-CCE that is referenced by the configured offset. For example, the original index in this example in FIG. 2, E-PDCCH PRB pair with index a, and offset 2.

Figure 2:
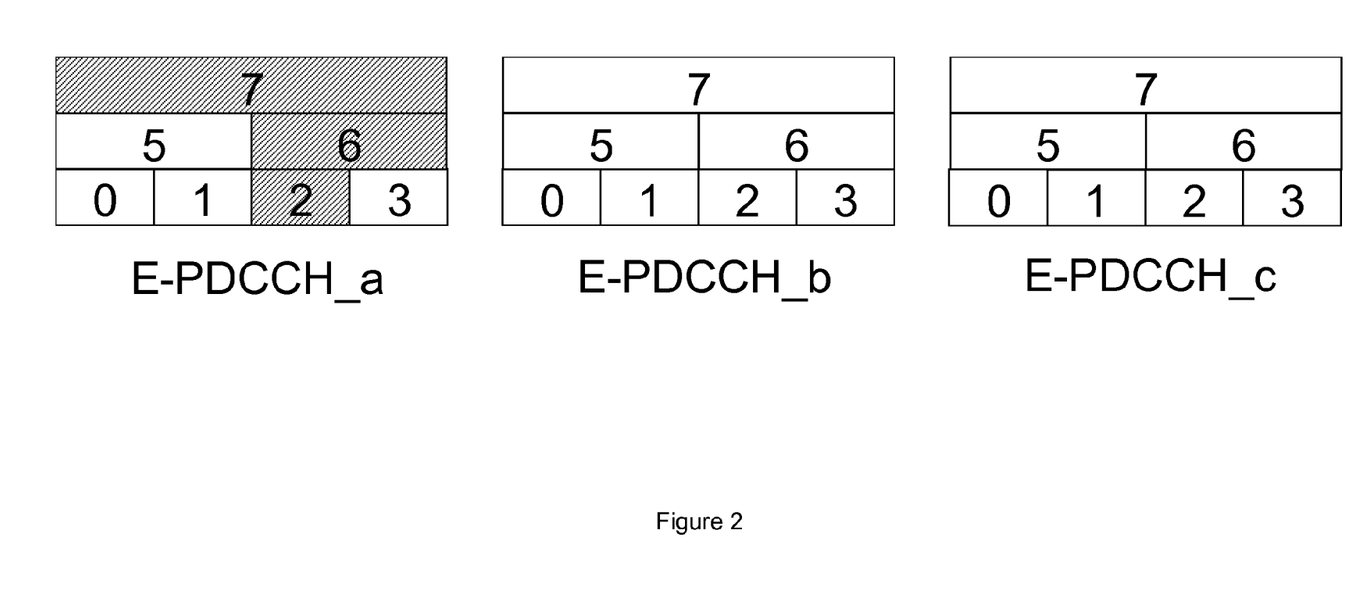
FIG. 2 illustrates an examplary starting position specified by index and offset according to certain embodiments.

FIG. 2 illustrates a starting position specified by index and offset according to certain embodiments. With this approach, a UE can attempt to decode for DCI information using three different assumptions of physical resources allocated to the transmission of PDCCH. This approach will create a total of 3 blind decoding attempts (namely an attempt at 2, 6, and 7 in E-PDDCH_a).

Figure 3:
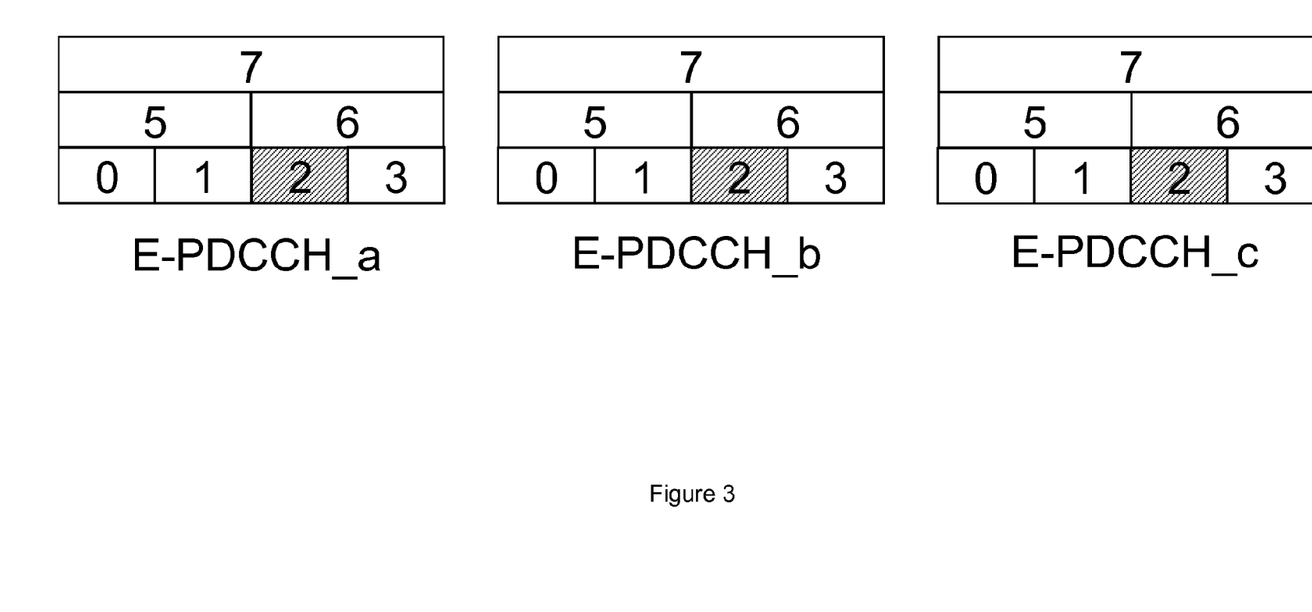
FIG. 3 illustrates duplication of indices that are for an original index, according to certain embodiments.

Another concern, as mentioned above, can be handling user multiplexing. To be able to handle multiple users that potentially have the same search index defined, some separation can be used between PRB pairs. For this, a simple duplication of the indices that are for the original index can be applied across different PRB pairs. This is illustrated in FIG. 3. Specifically, FIG. 3 illustrates duplication of indices that are for an original index, according to certain embodiments. As shown in FIG. 3, a UE with index 2 in E_PDCCH PRB a is also allowed to search for allocations in the other PRBs. Some potential restrictions can be applied to this permission. While using this approach, it is also possible to address the problem of providing frequency selective scheduling, as a UE will potentially be searching a number of PRB pairs, and with this, the scheduling entity will have the possibility to select the E-CCE with the better performance of the possible candidates, thereby providing a frequency selective scheduling gain for the E-PDCCH.

Figure 4:
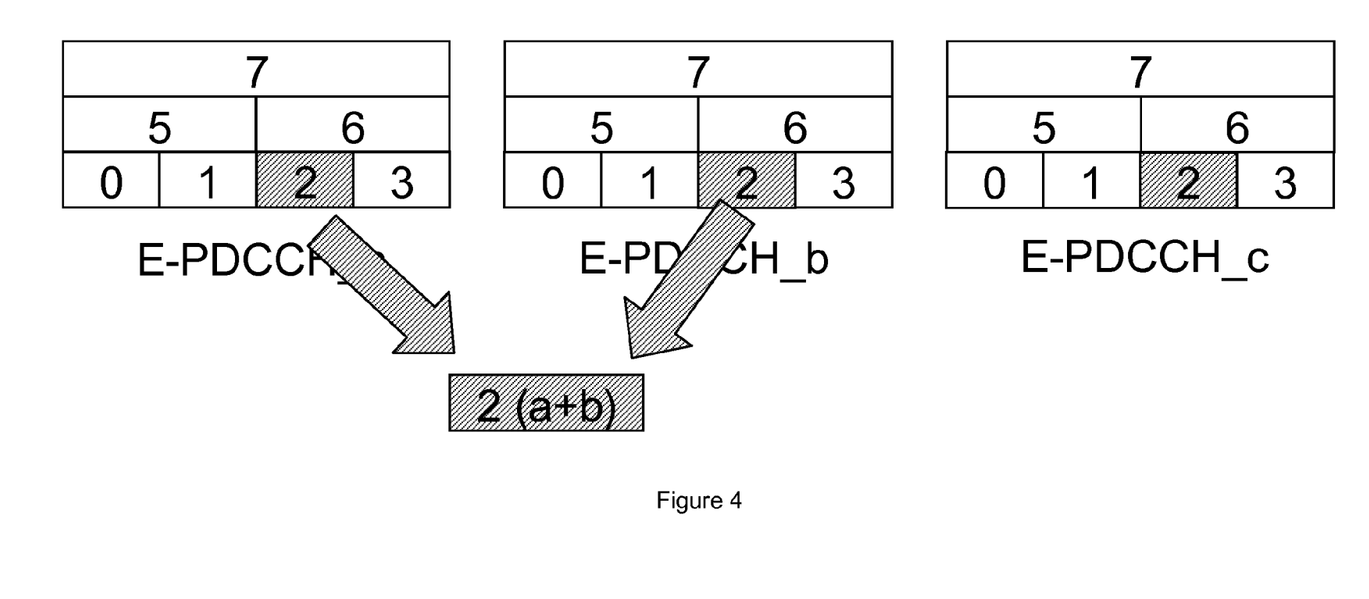
FIG. 4 illustrates combination of CCE resources across configured E-PDCCH resources according to certain embodiments.

A further concern can be how to ensure robustness of the E-PDCCH in challenging radio environments where the SINR on localized transmissions have important unpredictable variations in both time and frequency domain. To ensure robust E-PDCCH operation and to be able to schedule users without frequency selective information, the system can allow for combination of E-CCE resources across the configured E-PDCCH PRB pairs. FIG. 4 illustrates combination of E-CCE resources across configured E-PDCCH PRB pairs according to certain embodiments. In FIG. 4, a UE with index 2 in E_PDCCH PRB a will also be allowed to search for allocations in the other PRBs (with some potential restrictions). A set of aggregated resources are being created between PRB a and b in FIG. 4.

Figure 5:
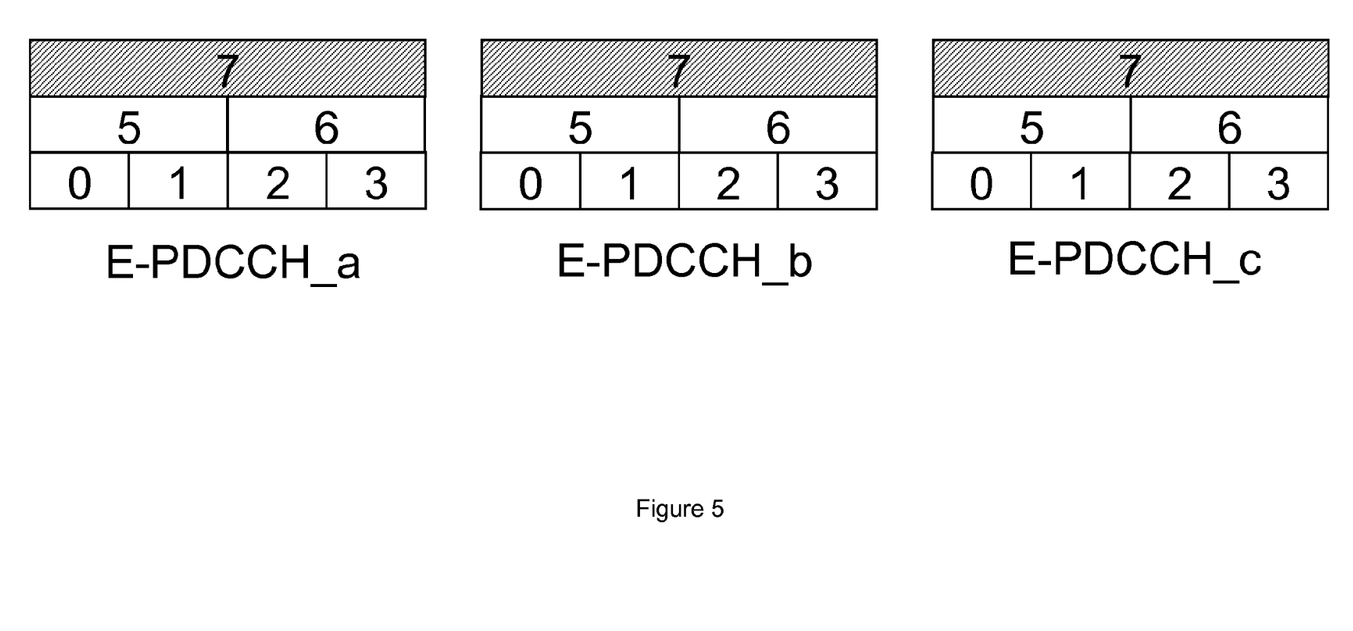
FIG. 5 illustrates aggregated candidate search positions in each PRB according to certain embodiments.

To be able to handle multiple users and still allow for coverage enhancements as well as allowing for frequency domain packet scheduling (FDPS), aggregated search positions in each PRB can be candidates for scheduling. FIG. 5 illustrates aggregated candidate search positions in each PRB according to certain embodiments. In FIG. 5, a UE with index 2 in E_PDCCH PRB a can also be allowed to search for allocations in the other PRBs (with some potential restrictions) at, for example, their highest aggregation level.

The total (maximum) number of decoding attempts for this exemplary case can be determined as follows: coverage within same PRB (increasing aggregation levels)—3 attempts (see FIG. 2); user flexibility—2 additional attempts (first is covered in the above, see FIG. 3 as compared to or overlaid on FIG. 2); diversity transmissions—3 (a+b, as shown in FIG. 4, as well as a+c, and a+b+c); and coverage and multiplexing—2 additional attempts (see FIG. 5 as compared to or overlaid on FIG. 2.

So this results in a total of up to 10 decoding attempts, which would be the maximum number of blind decoding attempts for E-PDCCH decoding. With more PRBs allocated for the E-PDCCH, the number of combinations that could be served may be restricted. For example, when there are many PRBs for scheduling, the system or protocol can restrict the multiplexing options to a limited set of candidates (for instance, the limited set can be four candidate PRBs).

The UE may need to puncture out E-PDCCH PRBs which are not part of the search space. To indicate these PRBs in the signaling, a length 5 CCE index can be used instead of length 4. One of the values can be used to indicate that this PRB has no search positions but needs to be punctured out.

In the following we illustrate how the above mentioned principles of combining a set of PRB indexes, a CCE index and a few carefully selected rules can be formalized. A search space for a UE can be treated as a set S of pairs of PRB index and CCE index. Each PRB is divided into N E-CCEs and the CCE index runs from 0 to N−1. In a specific example, a search space can include two PRBs, PRB 0 and 2. In PRB 0, E-CCE 0 and 1 are used and in PRB 2 only E-CCE 0 is used.

$S=\{\{0,0\}\{0,1\}\{2,0\}\}$

As discussed above aggregation of CCEs should also be supported. A generic way of defining this is to introduce a further hierarchy in the search space so that multiple E-CCEs can be combined. For example:

$S=\{\{\{0,0\},\{0,1\}\},\{\{1,0\},\{1,1\}\},\{\{0,1\}\}\}$

In this example, there is a 2 E-CCE allocation in PRB 0, then a 2 E-CCE allocation in PRB 1 and a 1 E-CCE allocation in PRB 0. Another example defines a distributed 4 E-CCE allocation where E-PDCCH is transmitted across E-CCEs in multiple PRBs:

$S=\{\{\{0,0\},\{1,0\},\{2,0\},\{3,0\}\}\}$

With this simple notation we can now illustrate certain embodiments.

First, a primary search space element can be defined. For example, this can be done by selecting a primary E-CCE by giving a PRB# and a CCE index. Rules are now defined so that, in a particular embodiment, starting from the primary search space element additional elements will be added automatically.

The following discussion illustrates a rule to add new search space elements for other aggregation levels and other PRBs. Primary search space element is given as follows:

S={{{0,0}}}

And search space after expansion

S={{{0,0},{{0,0}{0,1}},{{0,0}{0,1}{0,2}{0,3}}}

Further implicit rules can be added to automatically expand the search space. The automatic expansion can be, for example, additional diversity allocations. The following illustrates a search space with 4 1 E-CCE allocations in 4 different PRBs:

S={{{0,0}},{{1,0}},{{2,0}},{{3,0}}} (corresponding to the case in FIG. 3)

can be expanded to

S={{{0,0}},{{1,0}},{{2,0}},{{3,0}},{{0,0},{1,0},{2,0},{3,0}}}

In this expanded version, a 4 E-CCE diversity allocation is automatically added. This is the search space also shown above in FIG. 3.

Certain embodiments provide a very flexible framework for determining a UE search space for E-PDCCH in a way that takes into account the PRB granularity of the search space. The number of blind decodes in certain embodiments may be smaller compared to, for example, R-PDCCH. On the other hand, more bits may be used when configuring search space (using higher layer signaling). Network nodes (such as an eNodeB (eNB)) and user equipment (UE) can benefit from a search space arrangement when applying advanced features like carrier aggregation (CA), coordinated multipoint transmission (CoMP), and the like. Indeed, such a search arrangement may be useful where additional downlink (DL) control capacity is beneficial. However, other applications of the embodiments disclosed herein are also permitted.

Figure 6:
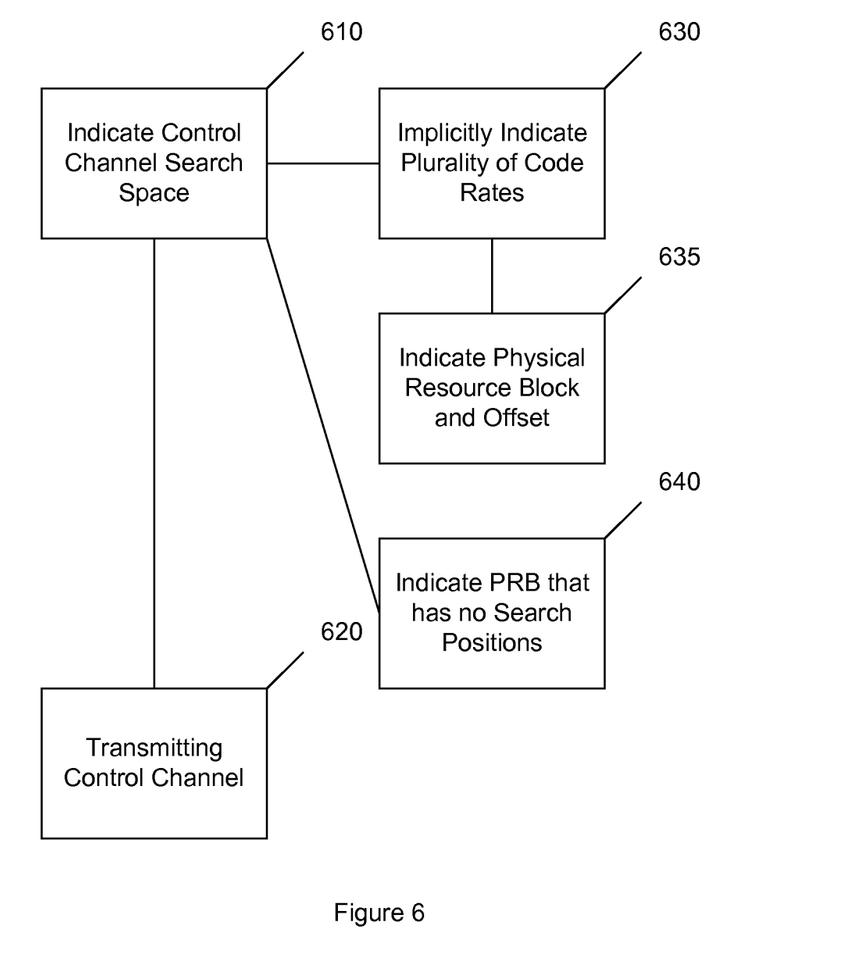
FIG. 6 illustrates a method according to certain embodiments.

FIG. 6 illustrates a method according to certain embodiments. This method may be performed by, for example, an evolved Node B or similar base station or access point. As shown in FIG. 6, the method can include indicating, at 610, a control channel (such as, for example, an E-PDCCH) search space by a pair of parameters, wherein the pair of parameters includes a physical resource block (PRB) index and an explicit control channel element (CCE) index. The method also includes, at 620, transmitting on the control channel within the search space.

The method can also include, at 630, implicitly indicating a plurality of code rates by explicitly indicating a single allocated primary physical resource block. The indicating can include indicating a starting index. The starting index is configured to inform a user equipment as to which control channel element index the user equipment is to use as a reference. The indicating the starting index can include, at 635, indicating a physical resource block index and offset.

The method can further include, at 640, indicating a physical resource block that has no search positions but is to be punctured out.

Figure 7:
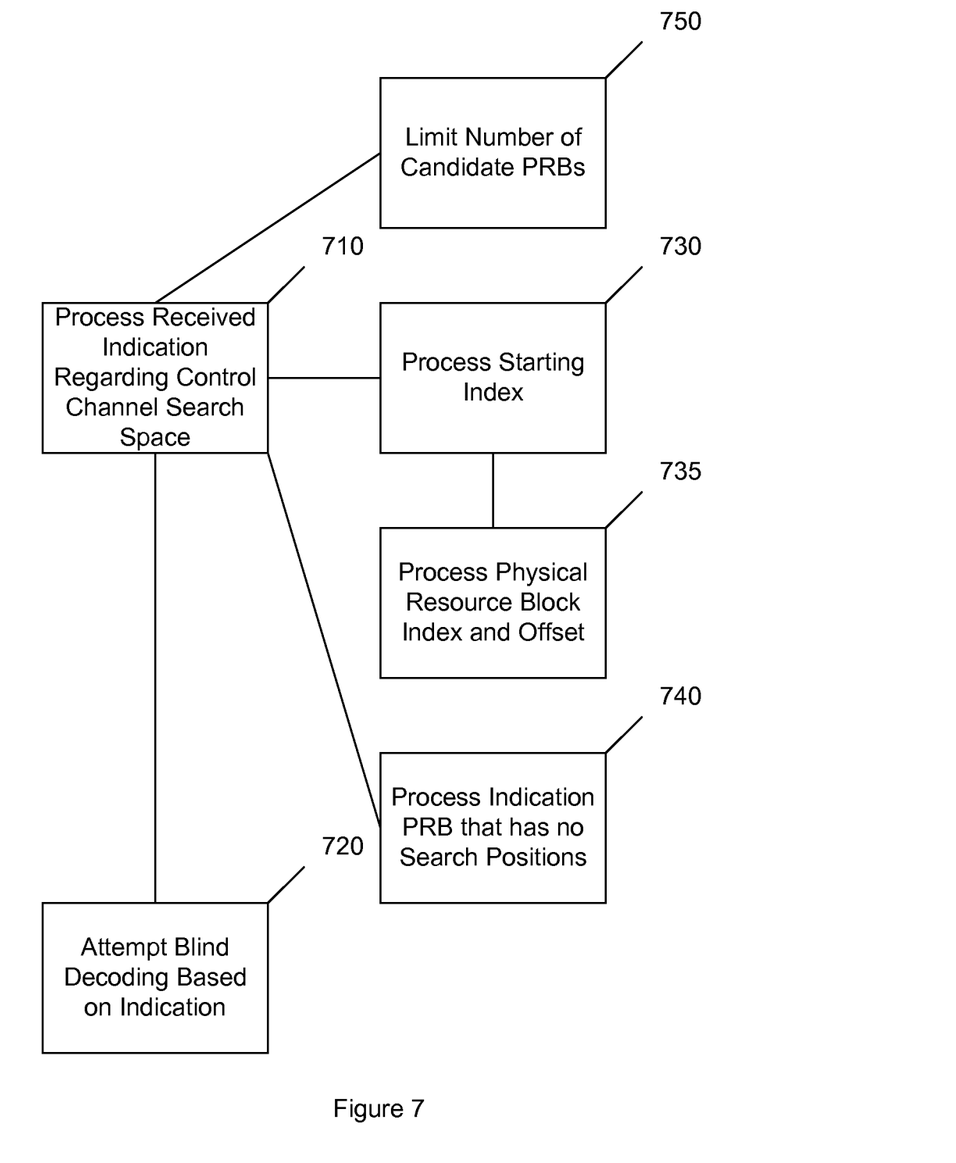
FIG. 7 illustrates another method according to certain embodiments.

FIG. 7 illustrates another method according to certain embodiments. The method of FIG. 7 may be performed by a user equipment or other network node, such as a relay node. The method can include, at 710, processing a received indication of a control channel (for example, an E-PDCCH) search space by a pair of parameters. The pair of parameters can include a physical resource block (PRB) index and an explicit control channel element (CCE) index. The method can also include, at 720, attempting blind decoding of the control channel using a search strategy based on the received indication.

The processing the received indication can include, at 730, processing a starting index, wherein the starting index is configured to inform a user equipment as to which control channel element index the user equipment is to use as a reference. The processing the starting index can include, at 735, processing a physical resource block index and offset.

The method can additionally include, at 740, processing an indication of a physical resource block that has no search positions but is to be punctured out. The method can additionally include, at 750, limiting candidate physical resource blocks used in the search strategy to a predetermined number of physical resource blocks that is less than a total number of available physical resource blocks.

Figure 8:
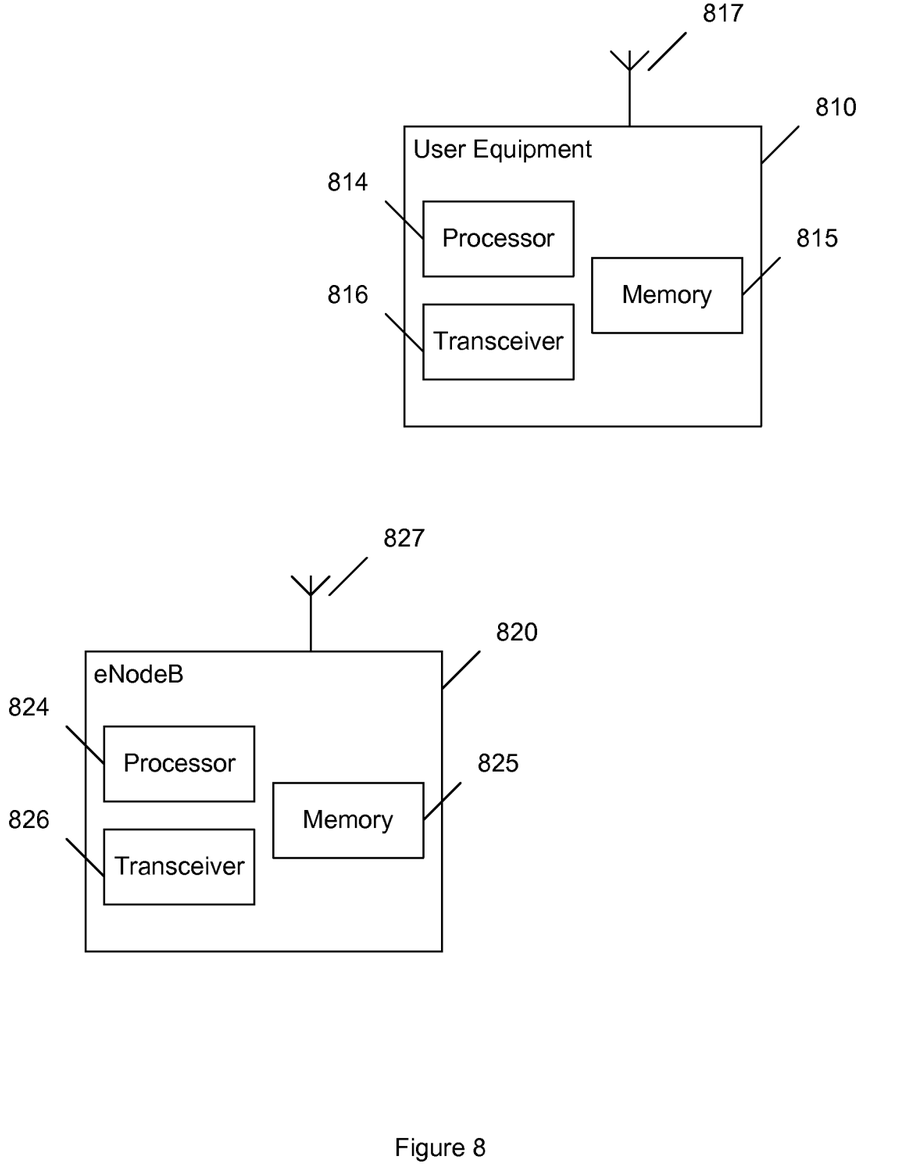
FIG. 8 illustrates a system according to certain embodiments.

FIG. 8 illustrates a system according to certain embodiments. In an example embodiment, a system may include two devices, user equipment (UE) 810 and eNodeB 820. Each of the devices 810 and 820 may be equipped with at least one processor (respectively 814 and 824), at least one memory (respectively 815 and 825) (including computer program instructions or code), a transceiver (respectively 816 and 826), and an antenna (respectively 817 and 827). There is no requirement that each of these devices be so equipped. For example, the eNodeB 820 may be equipped for wired communication with a core network (not shown).

The transceiver (respectively 816 and 826) can be a transmitter, a receiver, both a transmitter and a receiver, or a unit that is configured both for transmission and reception. The transceiver (respectively 816 and 826) can be coupled to corresponding one or more antenna(s) (respectively 817 and 827), which may include a directional antenna.

The at least one processor (respectively 814 and 824) can be variously embodied by any computational or data processing device, such as a central processing unit (CPU) or application specific integrated circuit (ASIC). The at least one processor (respectively 814 and 824) can be implemented as one or a plurality of controllers.

The at least one memory (respectively 815 and 825) can be any suitable storage device, such as a non-transitory computer-readable medium. For example, a hard disk drive (HDD) or random access memory (RAM) can be used in the at least one memory (respectively 815 and 825). The at least one memory (respectively 815 and 825) can be on a same chip as the corresponding at least one processor (respectively 814 and 824), or may be separate from the corresponding at least one processor (respectively 814 and 824).

The computer program instructions may be any suitable form of computer program code. For example, the computer program instructions may be a compiled or interpreted computer program.

The at least one memory (respectively 815 and 825) and computer program instructions can be configured to, with the at least one processor (respectively 814 and 824), cause a hardware apparatus (for example, user equipment 810 or eNodeB 820) to perform a process, such as any of the processes described herein (see, for example, FIGS. 6 and 7).

Thus, in certain embodiments, a non-transitory computer-readable medium can be encoded with computer instructions that, when executed in hardware perform a process, such as one of the processes described herein. Alternatively, certain embodiments of the present invention may be performed entirely in hardware.

The devices of the system may also include additional components. For example, each of user equipment 810 and eNodeB 820 can include a user interface that is operable connected to the processor (respectively 814 and 824) and memory (respectively 815 and 825). That user interface can include a display, such as a liquid crystal display (LCD) or organic electroluminescent display (OELD), as well as speakers or audio outputs. Tactile outputs, such as a haptic feedback system, can also be included. The user interface may have a touch screen to receive user input. User input can also be provided by a keypad, keyboard, microphone, joystick, mouse, trackball, or other input device. Of course, there is no requirement that the devices include a user interface. For example, the eNodeB 820 may be embodied in part as a rack-mounted computer.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
   indicating an Enhanced Physical Downlink Control Channel (EPDCCH) search space by a pair of parameters, wherein the pair of parameters includes a physical resource block index and an explicit control channel element index, the explicit control channel element index identifies a specific control channel element being used within a physical resource block corresponding to the physical resource block index, the explicit control channel element index is determined using the physical resource block index and number of control channel elements being used within the physical resource block corresponding to the physical resource block index, the number of control channel elements for the physical resource block index indicates possible aggregation levels inside the physical resource block corresponding to the physical resource block index, and a same user-specific starting position for the EPDCCH search space is used for each of the aggregation levels being used inside the physical resource block corresponding to the physical resource block index; and
   transmitting on the control channel within the search space.

2. The method of claim 1, further comprising:
   implicitly indicating a plurality of code rates by explicitly indicating a single allocated primary physical resource block.

3. The method of claim 1, wherein the indicating comprises indicating a starting index, wherein the starting index is configured to inform a user equipment as to which control channel element index the user equipment is to use as a reference.

4. The method of claim 3, wherein the indicating the starting index comprises indicating a physical resource block index and offset.

5. The method of claim 1, further comprising:
   indicating a physical resource block that has no search positions but is to be punctured out.

6. A method, comprising:
   processing a received indication of an Enhanced Physical Downlink Control Channel (EPDCCH) search space by a pair of parameters, wherein the pair of parameters includes a physical resource block index and an explicit control channel element index, the explicit control channel element index identifies a specific control channel element being used within a physical resource block corresponding to the physical resource block index, the explicit control channel element index is determined using the physical resource block index and number of control channel elements being used within the physical resource block corresponding to the physical resource block index, the number of control channel elements for the physical resource block index indicates possible aggregation levels inside the physical resource block corresponding to the physical resource block index, and a same user-specific starting position for the EPDCCH search space is used for each of the aggregation levels being used inside the physical resource block corresponding to the physical resource block index; and
   attempting blind decoding of the control channel using a search strategy based on the received indication.

7. The method of claim 6, wherein the processing the received indication comprises processing a starting index, wherein the starting index is configured to inform a user equipment as to which control channel element index the user equipment is to use as a reference.

8. The method of claim 7, wherein the processing the starting index comprises processing a physical resource block index and offset.

9. The method of claim 6, further comprising:
   processing an indication of a physical resource block that has no search positions but is to be punctured out.

10. The method of claim 6, further comprising:
    limiting candidate physical resource blocks used in the search strategy to a predetermined number of physical resource blocks that is less than a total number of available physical resource blocks.

11. An apparatus, comprising:
    at least one processor; and
    at least one memory including computer program code,
    wherein the at least one memory and the computer program code are configured to, with the at least one processor, cause the apparatus at least to
    indicate an Enhanced Physical Downlink Control Channel (EPDCCH) search space by a pair of parameters, wherein the pair of parameters includes a physical resource block index and an explicit control channel element index, the explicit control channel element index identifies a specific control channel element being used within a physical resource block corresponding to the physical resource block index, the explicit control channel element index is determined using the physical resource block index and number of control channel elements being used within the physical resource block corresponding to the physical resource block index, the number of control channel elements for the physical resource block index indicates possible aggregation levels inside the physical resource block corresponding to the physical resource block index, and a same user-specific starting position for the EPDCCH search space is used for each of the aggregation levels being used inside the physical resource block corresponding to the physical resource block index; and
    transmit on the control channel within the search space.

12. The apparatus of claim 11, wherein the at least one memory and the computer program code are configured to, with the at least one processor, cause the apparatus at least to implicitly indicate a plurality of code rates by explicitly indicating a single allocated primary physical resource block.

13. The apparatus of claim 11, wherein the at least one memory and the computer program code are configured to, with the at least one processor, cause the apparatus at least to indicate a starting index, wherein the starting index is configured to inform a user equipment as to which control channel element index the user equipment is to use as a reference.

14. The apparatus of claim 13, wherein the at least one memory and the computer program code are configured to, with the at least one processor, cause the apparatus at least to indicate the starting index by indicating a physical resource block index and offset.

15. The apparatus of claim 11, wherein the at least one memory and the computer program code are configured to, with the at least one processor, cause the apparatus at least to indicate a physical resource block that has no search positions but is to be punctured out.

16. An apparatus, comprising:
   at least one processor; and
   at least one memory including computer program code,
   wherein the at least one memory and the computer program code are configured to, with the at least one processor, cause the apparatus at least to
   process a received indication of an Enhanced Physical Downlink Control Channel (EPDCCH) search space by a pair of parameters, wherein the pair of parameters includes a physical resource block index and an explicit control channel element index, the explicit control channel element index identifies a specific control channel element being used within a physical resource block corresponding to the physical resource block index, the explicit control channel element index is determined using the physical resource block index and number of control channel elements being used within the physical resource blocker corresponding to the physical resource block index, the number of control channel elements for the physical resource block index indicates possible aggregation levels inside the physical resource block corresponding to the physical resource block index, and a same user-specific starting position for the EPDCCH search space is used for each of the aggregation levels being used inside the physical resource block corresponding to the physical resource block index; and
   attempt blind decoding of the control channel using a search strategy based on the received indication.

17. The apparatus of claim 16, wherein the at least one memory and the computer program code are configured to, with the at least one processor, cause the apparatus at least to process a starting index, wherein the starting index is configured to inform a user equipment as to which control channel element index the user equipment is to use as a reference.

18. The apparatus of claim 17, wherein the at least one memory and the computer program code are configured to, with the at least one processor, cause the apparatus at least to process a physical resource block index and offset.

19. The apparatus of claim 16, wherein the at least one memory and the computer program code are configured to, with the at least one processor, cause the apparatus at least to process an indication of a physical resource block that has no search positions but is to be punctured out.

20. The apparatus of claim 16, wherein the at least one memory and the computer program code are configured to, with the at least one processor, cause the apparatus at least to limit candidate physical resource blocks used in the search strategy to a predetermined number of physical resource blocks that is less than a total number of available physical resource blocks.

21. A method, comprising:
   deriving an Enhanced Physical Downlink Control Channel (EPDCCH) search space based on a set of physical resource blocks and a control channel element identifier, the control channel element index identifies a specific control channel element being used within a physical resource block corresponding to the physical resource block index, the control channel element identifier is determined using a physical resource block index and number of control channel elements being used within the physical resource blocker corresponding to the physical resource block index, the number of control channel elements for the physical resource block index indicates possible aggregation levels inside the physical resource block corresponding to the physical resource block index, and a same user-specific starting position for the EPDCCH search space is used for each of the aggregation levels being used inside the physical resource block corresponding to the physical resource block index,
   wherein the control channel search space allows the control channel to be transmitted with different code rates, transmitted in different physical resource blocks, localized into one physical resource block, or distributed into multiple physical resource blocks.

22. The method of claim 21, wherein parameters defining the search space are signaled directly or partly derived from other parameters.

23. The method of claim 22, wherein the other parameters include at least one of a user equipment identifier and a cell identifier.

24. An apparatus, comprising:
   at least one processor; and
   at least one memory including computer program code,
   wherein the at least one memory and the computer program code are configured to, with the at least one processor, cause the apparatus at least to
   derive an Enhanced Physical Downlink Control Channel (EPDCCH) search space based on a set of physical resource blocks and a control channel element identifier, the control channel element index identifies a specific control channel element being used within a physical resource block corresponding to the physical resource block index, the control channel element identifier is determined using a physical resource block index and number of control channel elements being used within the physical resource block corresponding to the physical resource block index, the number of control channel elements for the physical resource block index indicates possible aggregation levels inside the physical resource block corresponding to the physical resource block index, and a same user-specific starting position for the EPDCCH search space is used for each of the aggregation levels being used inside the physical resource block corresponding to the physical resource block index,
   wherein the control channel search space allows the control channel to be transmitted with different code rates, transmitted in different physical resource blocks, localized into one physical resource block, or distributed into multiple physical resource blocks.

25. The apparatus of claim 24, wherein parameters defining the search space are signaled directly or partly derived from other parameters.

26. The apparatus of claim 25, wherein the other parameters include at least one of a user equipment identifier and a cell identifier.

* * * * *